US011632488B2

(12) United States Patent
Arazaki

(10) Patent No.: US 11,632,488 B2
(45) Date of Patent: Apr. 18, 2023

(54) IMAGE PROCESSING APPARATUS AND IMAGE PROCESSING METHOD

(71) Applicant: Seiko Epson Corporation, Tokyo (JP)

(72) Inventor: Shinichi Arazaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/656,758

(22) Filed: Mar. 28, 2022

(65) Prior Publication Data

US 2022/0311904 A1 Sep. 29, 2022

(30) Foreign Application Priority Data

Mar. 29, 2021 (JP) .............................. JP2021-054804

(51) Int. Cl.
 *H04N 1/405* (2006.01)
(52) U.S. Cl.
 CPC ................................. *H04N 1/4052* (2013.01)
(58) Field of Classification Search
 CPC .................................................... H04N 1/4052
 See application file for complete search history.

(56) References Cited

U.S. PATENT DOCUMENTS

| 5,553,165 | A | * | 9/1996 | Webb | H04N 1/4052 382/234 |
| 2005/0088700 | A1 | * | 4/2005 | Aoki | H04N 1/4052 358/3.05 |
| 2012/0163731 | A1 | * | 6/2012 | Arazaki | H04N 1/4052 382/276 |
| 2020/0120234 | A1 | * | 4/2020 | Kakutani | H04N 1/405 |

FOREIGN PATENT DOCUMENTS

| JP | H07-020839 | | 1/1995 | |
| JP | 2000-125122 | | 4/2000 | |
| JP | 2000125122 | A * | 4/2000 | |
| JP | 3995868 | B2 * | 10/2007 | ........... H04N 1/4052 |

\* cited by examiner

*Primary Examiner* — Ted W Barnes
(74) *Attorney, Agent, or Firm* — Workman Nydegger

(57) ABSTRACT

A pixel that is a target pixel being a processing target of a first multi-valuing unit is regarded as a first target pixel. A pixel that belongs to a pixel row adjacent to the pixel row to which the first target pixel belongs in the image data before conversion and is a target pixel being a processing target of a second multi-valuing unit is regarded as a second target pixel. A conversion unit converts the pixel array in the image data so that the first target pixel and the second target pixel are stored at serial addresses in a memory. An error diffusion processing unit performs multi-valuing by the first multi-valuing unit for the first target pixel in the image data after conversion and multi-valuing by the second multi-valuing unit for the second target pixel in the image data after conversion in a parallel manner.

8 Claims, 12 Drawing Sheets

IMAGE PROCESSING APPARATUS AND IMAGE PROCESSING METHOD

The present application is based on, and claims priority from JP Application Serial Number 2021-054804, filed Mar. 29, 2021, the disclosure of which is hereby incorporated by reference herein in its entirety.

BACKGROUND

1. Technical Field

The present disclosure relates to an image processing apparatus and an image processing method that performs multi-valuing on image data by an error diffusion method.

2. Related Art

A pixel value of each pixel in image data, which is expressed in multiple tones, is subjected to halftone processing and is converted into binary data indicating formation of a dot (dot-on) or non-formation of a dot (dot-off) with ink by a printer. Further, when a printer is capable of forming dots of a plurality of sizes, for examples, a large dot, a middle dot, and a small dot, a pixel value expressed in multiple tones is subjected to halftone processing and is converted into four-level data indicating one of large dot-on, middle dot-on, small dot-on, and dot-off in some cases. Such conversion to acquire data having a smaller number of tones such as binary data and four-level data is referred to as multi-valuing.

As a method of halftone processing, an error diffusion method has been known. Further, there is disclosed an image processing apparatus that performs parallel multi-valuing with the error diffusion method for a plurality of pixels, among raw pixels before multi-valuing, that have determined density errors diffused from other pixels (see JP-A-2000-125122).

Parallel multi-valuing is performed with the error diffusion method for a plurality of pixels having determined density errors diffusion from other pixels, and thus acceleration of multi-valuing processing for the entire image data is achieved. However, when an access speed to a memory is slow, acceleration achieved by parallel processing is less effective. In other words, even when a plurality of processing units are to perform access in parallel to a plurality of pixels being multi-valuing targets that are stored in a memory, efficiency in memory access is degraded in a state in which addresses stored for the respective pixels being access destinations are scattered in an irregular manner in the memory. As a result, each of the processing units cannot quickly perform reading and writing of data for multi-valuing. Thus, it has been desired that acceleration due to parallel processing be truly achieved by improving efficiency in memory access.

SUMMARY

When image data including a plurality of pixels arrayed two-dimensionally in a first direction and a second direction intersecting with each other is input, and multi-valuing is performed for the image data that is input, with an error diffusion method of diffusing a density error generated at the time of multi-valuing for a pixel to peripheral pixels before multi-valuing, an image processing apparatus is configured to perform parallel multi-valuing with the error diffusion method for a plurality of target pixels while regarding, among the pixels before multi-valuing, a plurality of pixels with the density error diffused from another pixel that are determined as the target pixels. The image processing apparatus includes a memory configured to store the image data being input, an error diffusion processing unit including a plurality of multi-valuing units configured to perform parallel multi-valuing with the error diffusion method for the plurality of target pixels, and a conversion unit configured to convert a pixel array in the image data. When a pixel that belongs to one pixel row being a pixel line along the first direction in the image data before conversion by the conversion unit and is a processing target of a first multi-valuing unit being one of the plurality of multi-valuing units is regarded as a first target pixel, and a pixel that belongs to a pixel row adjacent in the second direction to the pixel row to which the first target pixel belongs in the image data before conversion by the conversion unit is a processing target of a second multi-valuing unit being one of the plurality of multi-valuing units is regarded as a second target pixel, the conversion unit converts the pixel array in the image data so that the first target pixel and the second target pixel are stored at serial addresses in the memory. The error diffusion processing unit performs multi-valuing by the first multi-valuing unit for the first target pixel in the image data after conversion by the conversion unit and multi-valuing by the second multi-valuing unit for the second target pixel in the image data after conversion by the conversion unit in a parallel manner.

When image data including a plurality of pixels arrayed two-dimensionally in a first direction and a second direction intersecting with each other is input, and multi-valuing is performed for the image data that is input, with an error diffusion method of diffusing a density error generated at the time of multi-valuing for a pixel to peripheral pixels before multi-valuing, an image processing method is for performing parallel multi-valuing with the error diffusion method for a plurality of target pixels while regarding, among the pixels before multi-valuing, a plurality of pixels with the density error diffused from another pixel that are determined as the target pixels. The image processing method includes a storing step for storing, in a memory, the image data being input, a converting step for converting a pixel array in the image data, and an error diffusion processing step for performing parallel multi-valuing with the error diffusion method for the plurality of target pixels, using a plurality of multi-valuing units. In the converting step, when a pixel that belongs to one pixel row being a pixel line along the first direction in the image data before the converting step and is a processing target of a first multi-valuing unit being one of the plurality of multi-valuing units is regarded as a first target pixel, and a pixel that belongs to a pixel row adjacent in the second direction to the pixel row to which the first target pixel belongs in the image data before the converting step is a processing target of a second multi-valuing unit being one of the plurality of multi-valuing units is regarded as a second target pixel, the pixel array in the image data is converted so that the first target pixel and the second target pixel are stored at serial addresses in the memory. In the error diffusion processing step, multi-valuing by the first multi-valuing unit for the first target pixel in the image data after the converting step and multi-valuing by the second multi-valuing unit for the second target pixel in the image data after the converting step are performed in a parallel manner.

BRIEF DESCRIPTION OF THE DRAWINGS

FIG. 8 is a diagram illustrating image data after conversion of pixel array.

FIG. 10 is a diagram illustrating parallel multi-valuing processing performed by a plurality of cores for the image data in FIG. 8.

DESCRIPTION OF EXEMPLARY EMBODIMENTS

Exemplary embodiments of the present disclosure are described below with reference to the accompanying drawings. Note that each of the drawings is merely illustrative for describing the present exemplary embodiments. Since the drawings are illustrative, proportions and shapes may not be precise, match each other, or some may be omitted.

1. Outline of System Configuration

Figure 1:
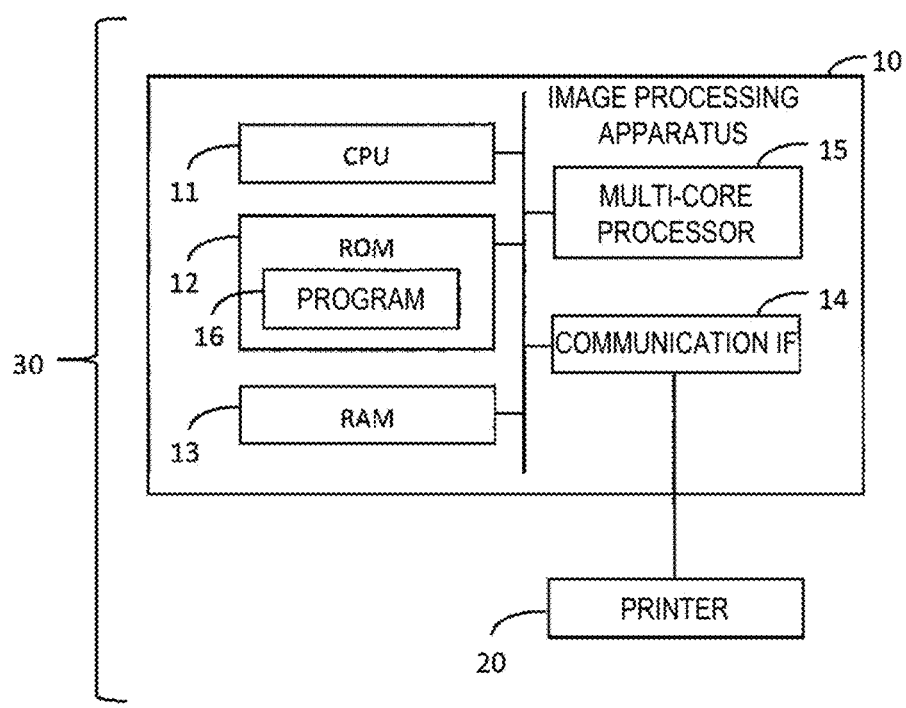
FIG. 1 is a block diagram illustrating a system configuration including an image processing apparatus in a simplified manner.

FIG. 1 illustrates a configuration of a system 30 including an image processing apparatus 10 according to the present exemplary embodiment in a simplified manner. In addition to a CPU 11, a ROM 12, and a RAM 13 that are configurations basic to a computer, the image processing apparatus 10 further includes a communication IF 14, a multi-core processor 15, and other memories or storage devices. IF is an abbreviation for interface. In the image processing apparatus 10, the processor, that is, the CPU 11 executes arithmetic processing in accordance with one or more programs 16 stored in the ROM 12 or other memories, using the RAM 13 or the like as a work area. In this manner, the image processing method is performed.

The communication IF 14 is a generic term for one or a plurality of IFs for coupling the image processing apparatus 10 to the outside in a wired or wireless manner, in accordance with a prescribed communication protocol including a known communication standard. In the example of FIG. 1, the image processing apparatus 10 is communicably coupled to a printer 20 via the communication IF 14. The image processing apparatus 10 may be coupled to any other equipment in addition to the printer 20, and may be coupled to a scanner capable of optically reading a document or an external server, for example. As a matter of course, the image processing apparatus 10 may include a display unit that displays visual information for a user, an operation panel that receives an operation from a user, or the like.

As understood from the name, the multi-core processor 15 is a processor including a plurality of cores, and is suitable for parallel processing using a plurality of cores. The multi-core processor 15 is a Graphics Processing Unit (GPU), for example. Alternatively, the CPU 11 itself may be a multi-core processor including a plurality of cores. In the following description, the CPU 11 and the multi-core processor 15 are not distinguished from each other, and are collectively and simply referred to as a processor in some cases.

The printer 20 is a so-called inkjet printer including a plurality of nozzles, and performs printing on a printing medium by performing or preventing ejection of ink or other liquids in a dot shape from the respective nozzles. The printer 20 is capable of ejecting a plurality of colors of ink, such as cyan (C), magenta (M), yellow (Y), and black (K), for example. The image processing apparatus 10 generates printing data to be used by the printer 20 for printing, and transfers the printing data to the printer 20. In the process of generating the printing data, the image processing apparatus 10 performs multi-valuing for image data with an error diffusion method.

The image processing apparatus 10 and the printer 20 may be apparatuses independent from each other as illustrated in FIG. 1, or may be integrated with each other. In other words, the system 30 including the image processing apparatus 10 and the printer 20 may be one printing apparatus in an actual state.

Alternatively, the image processing apparatus 10 may be achieved by a plurality of devices that are communicably coupled to each other and serve respective functions.

2. Basic Description for Parallel Processing With Error Diffusion Method

Next, description is given on the basic concept when parallel processing for multi-valuing is executed with an error diffusion method.

Figure 2A:
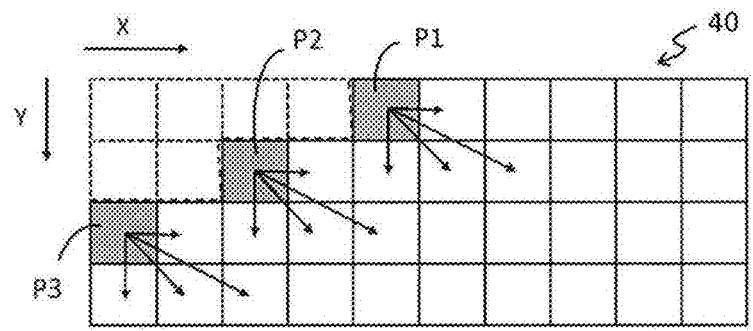
FIG. 2A, FIG. 2B, and FIG. 2C are diagrams each illustrating a plurality of target pixels with determined density errors and diffusion ranges of the density errors.

FIG. 2A illustrates part of image data 40 being a target for multi-valuing with the error diffusion method. The image data 40 includes a plurality of pixels arrayed two-dimensionally in an X-axis direction an a Y-axis direction intersecting with each other. The X-axis direction corresponds to a first direction, and the Y-axis direction corresponds to a second direction. In the following description, the X-axis direction is also referred to as a +X direction, and a direction opposite to the X-axis direction is also referred to as a −X direction. Similarly, the Y-axis direction is also referred to as a +Y direction, and a direction opposite to the Y-axis direction is also referred to as a −Y direction. Each of rectangular shapes forming the image data 40 indicates a pixel.

Each of the pixels in the image data 40 has, as data, a tone value for each of a plurality of colors, in this case, a tone value indicating density for each of C, M, Y, and K that correspond to the ink colors used in the printer 20. The tone value is a value falling within a 256-sage tone range from 0 to 255, for example. The respective colors C, M, Y, and K are subjected to multi-valuing in the same manner, and hence a multi-valuing method for one color is described below. Further, multi-valuing may be four-level valuing or the like as described above. In the following description, however, an example of binarization is given. The processor compares a tone value of the target pixel being a multi-valuing target with a predetermined threshold value. When the tone value is equal to or greater than the threshold value, data of the target pixel after multi-valuing is set to "1" indicating dot-on. When the tone value is less than the threshold value, data of the target pixel after multi-valuing is set to "0" indicating dot-off.

As is known, in the error diffusion method, a density error generated at the time of subjecting the target pixel to multi-valuing is diffused to peripheral pixels before multi-valuing. Dot-on obtained as a result of multi-valuing corresponds to 255 being maximum density in the above-mentioned tone value scale. Further, dot-off obtained as a result of multi-valuing corresponds to 0 being minimum density in the above-mentioned tone value scale. Therefore, a difference between a tone value of a certain pixel before multi-valuing and a tone value corresponding to a result of multi-valuing is a density error obtained as a result of subjecting the pixel to multi-valuing.

In FIG. 2A, a pixel after multi-valuing is indicated with a broken line, and a pixel before multi-valuing is indicated with a solid line. Further, pixels P1, P2, and P3 that are painted in gray among the pixels before multi-valuing are target pixels being current multi-valuing targets. Here, in the image data, an array of pixels along the X-axis direction is referred to as a "pixel row", and an array of pixels along the Y-axis direction is referred to as a "pixel column". The processor is capable of sequentially performing multi-valuing while switching target pixels one by one in a pixel row in the +X direction.

The arrows extending to peripheral pixels from each of the target pixels P1, P2, and P3 indicate a diffusion range in which a density error is diffused. In the example of FIG. 2A, a density error generated in one pixel is distributed to, with the pixel as a reference, a pixel adjacent to the pixel in the +X direction, a pixel adjacent to the pixel in the +Y direction, a pixel at a position away from the pixel by one pixel in the +X direction and the +Y direction, and a pixel at a position away from the pixel by two pixels in the +X direction and one pixel in the +Y direction. A distribution ratio of the density error to each of those pixels being diffusion destinations may be even or a weighted ratio.

Multi-valuing with the error diffusion method is performed for a pixel with a determined density error diffused from another pixel after multi-valuing. When a pixel has a determined density error, the pixel does not receive further diffusion of a density error from any other pixels. At the time point illustrated in FIG. 2A, each of the target pixels P1, P2, and P3 is in a state in which a density error to be diffused is determined. Further, the diffusion ranges with the target pixels P1, P2, and P3 as references do not overlap with one another. In other words, the processor is capable of performing parallel multi-valuing for the plurality of target pixels P1, P2, and P3 in such a relationship. As understood from the description given above, the tone value of the target pixel that is compared with the threshold value for multi-valuing corresponds to a tone value obtained after the original tone value of the target pixel is corrected with the determined density error of the target pixel.

In FIG. 2A, the target pixel P2 belongs to a pixel row adjacent to a pixel row in the +Y direction to which the target pixel P1 belong. Similarly, the target pixel P3 belongs to a pixel row adjacent to a pixel row in the +Y direction to which the target pixel P2 belongs. In this manner, pixels for which density errors diffused from another pixel after multi-valuing are determined at the same timings are present in respective pixel rows at a certain timing. Thus, the processor is capable of performing parallel multi-valuing for the target pixels belonging to the respective pixel rows.

Figure 3:
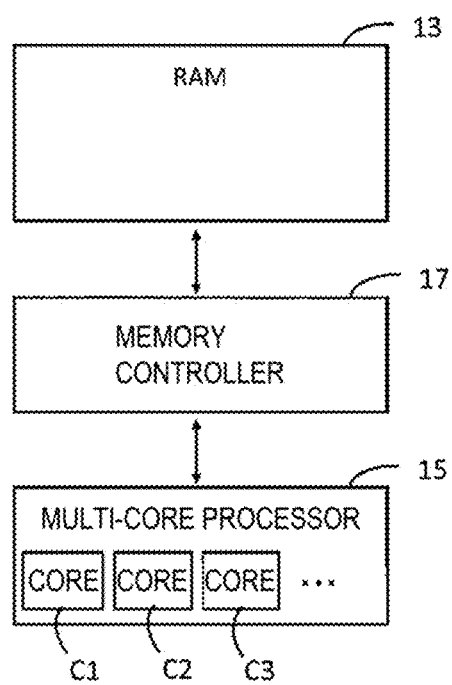
FIG. 3 is a diagram illustrating a relationship of a multi-core processor, a memory controller, and a RAM in a simplified manner.

FIG. 3 illustrates a relationship of the multi-core processor 15, a memory controller 17, and the RAM 13 in the image processing apparatus 10 in a simplified manner. In FIG. 1, illustration of the memory controller 17 is omitted. The RAM 13 stores the image data 40 being a multi-valuing target. For example, the RAM 13 is a Dynamic Random Access Memory (DRAM). The multi-core processor 15 includes a plurality of cores C1, C2, C3, . . . . The plurality of cores C1, C2, C3, . . . corresponds to a plurality of multi-valuing units that perform parallel multi-valuing with the error diffusion method for the plurality of target pixels. Further, the multi-core processor 15 corresponds to an "error diffusion processing unit" including the plurality of multi-valuing units described above.

Here, it is assumed that the multi-core processor 15 performs parallel multi-valuing for the target pixels P1, P2, and P3 illustrated in FIG. 2A. In this case, for example, the core C1 requests a tone value of the target pixel P1 from the memory controller 17. Then, in response to the request, the memory controller 17 accesses to the RAM 13, reads out the tone value of the target pixel P1, and delivers the read-out tone value of the target pixel P1 to the core C1. The core C1 acquires binarized data by comparing the tone value of the target pixel P1, which is acquired from the memory controller 17, with the threshold value, and writes the binarized data as data of the target pixel P1 into the RAM 13, again, via the memory controller 17.

Similarly, the core C2 requests a tone value of the target pixel P2 from the memory controller 17, compares the tone value of the target pixel P2, which is acquired from the memory controller 17, with the threshold value, performs binarization, and writes the binarized data of the target pixel P2 into the RAM 13 via the memory controller 17. Similarly, the core C3 requests a tone value of the target pixel P3 from the memory controller 17, compares the tone value of the target pixel P3, which is acquired from the memory controller 17, with the threshold value, performs binarization, and writes the binarized data of the target pixel P3 into the RAM 13 via the memory controller 17.

The RAM 13 stores data of the respective pixels in the image data, which are aligned with serial addresses in the memory according to the order of coordinates of the pixels. The order of coordinates of the pixels is an order starting from a pixel with a minimum coordinate (1, 1) being an X-Y coordinate (X, Y) in the X-axis direction and the Y-axis direction to the last pixel having the largest numbers in (X, Y). In FIG. 2A, a pixel at the upper-left corner in the image data 40 is a pixel with a coordinate of (X, Y)=(1, 1). According to the order of coordinates of the pixels, in the memory, the pixels in the same pixel row are stored in line in the order of the X coordinates. After the last pixel with the largest X coordinate in the pixel row comes a leading pixel with the smallest X coordinate in a pixel row with a Y coordinate greater than that of the previous pixel row by one. In the following description, a pixel is associated with a coordinate, and is denoted as the pixel (X, Y) in some cases.

Therefore, in the RAM 13 that stores the image data 40, the target pixels P1, P2, and P3 are stored at the respective addresses scattered away from one another. As a matter of course, the number of target pixels for which the multi-core processor 15 performs parallel multi-valuing may be more than three. When the plurality of cores are to access to the plurality of addresses simultaneously, which are scattered as described above, via the memory controller 17, access efficiency from the memory controller 17 to the RAM 13 is degraded. As a result, each of the cores is forced to be in a stand-by mode for reading/writing of required data. In other words, even when the plurality of cores are used to perform parallel multi-valuing for the plurality of target pixels, an access speed to the memory is reduced. With this, acceleration of multi-valuing processing cannot be achieved sufficiently.

The present exemplary embodiment provides a solution for this problem in the following description.

3. From Data Input to Conversion of Pixel Array

Figure 4:
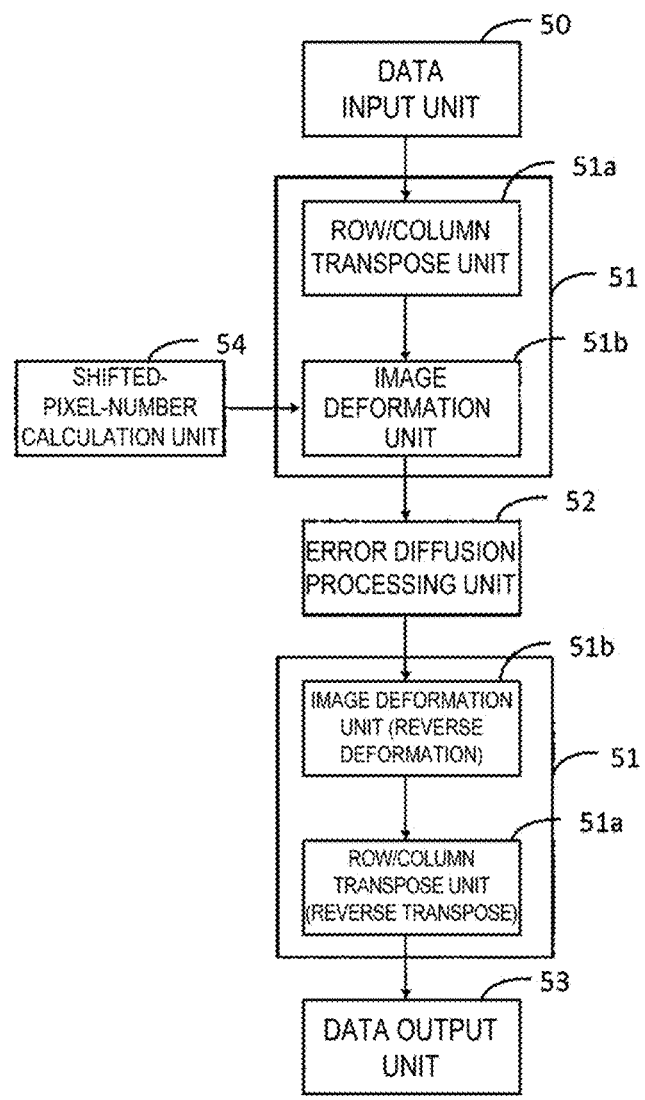
FIG. 4 is a diagram illustrating each function achieved by cooperation between a processor and a program.

FIG. 4 is a block diagram illustrating functions achieved by cooperation between the processor of the image processing apparatus 10 and a program 16 in the present exemplary embodiment. In the diagram, the functions are divided into a data input unit 50, a conversion unit 51, an error diffusion processing unit 52, a data output unit 53, and a shifted-pixel-number calculation unit 54. Further, FIG. 4 illustrates a flow of the processing by the respective functions.

the data input unit 50 inputs the image data 40 being a processing target, and stores the input data in the RAM 13. In other words, the data input unit 50 performs a storing step for storing the input image data in the memory. For the data input unit 50, an input source of the image data 40 is not particularly limited. For example, the data input unit 50 inputs the image data 40, which is generated by reading a document with an external scanner, via the communication IF 14. Alternatively, the data input unit 50 inputs the image data 40, which is stored in an external server or the like, via the communication IF 14. Further, the data input unit 50 may acquire the image data 40 from a storage medium inside or outside the image processing apparatus 10.

Note that a format of the image data 40 input by the data input unit 50 is not necessarily CMYK image data described above for each pixel having a tone value for each of C, M, Y, and K. Thus, the data input unit 50 subjects the input image data to necessary processing such as color conversion processing as appropriate, and stores the image data 40 as the CMYK image data in the RAM 13.

Next, the conversion unit 51 converts the pixel array in the image data 40 that is input by the data input unit 50 and stored in the RAM 13. The processing by the conversion unit 51 corresponds to a converting step. In the present exemplary embodiment, a target pixel being a processing target of a first multi-valuing unit that is one of a plurality of multi-valuing units is referred to as a "first target pixel". The first target pixel is a pixel belonging to one pixel row in the image data 40 before conversion performed by the conversion unit 51. Further, a target pixel being a processing target of a second multi-valuing unit that is one of the plurality of multi-valuing units is referred to as a "second target pixel". The second target pixel is a pixel belonging to a pixel row adjacent to the pixel row in the +Y direction to which the first target pixel belongs in the image data 40 before conversion performed by the conversion unit 51. In other words, the first target pixel and the second target pixel are in such a relationship that parallel multi-valuing with the error diffusion method is performed. With reference to FIG. 2A, for example, when the target pixel P1 is regarded as the first target pixel, the target pixel P2 corresponds to the second target pixel. Further, for example, when the target pixel P2 is regarded as the first target pixel, the target pixel P3 corresponds to the second target pixel.

In the present exemplary embodiment, the conversion unit 51 converts the pixel array in the image data 40 so that the first target pixel and the second target pixel are stored at addresses that are aligned in a serial manner in the RAM 13. As illustrated in FIG. 4, the conversion unit 51 includes a row/column transpose unit 51a and an image deformation unit 51b. Such conversion processing for pixel array, which is performed by the conversion unit 51, is described in detail with reference to FIG. 5 and FIG. 6.

Figure 5:
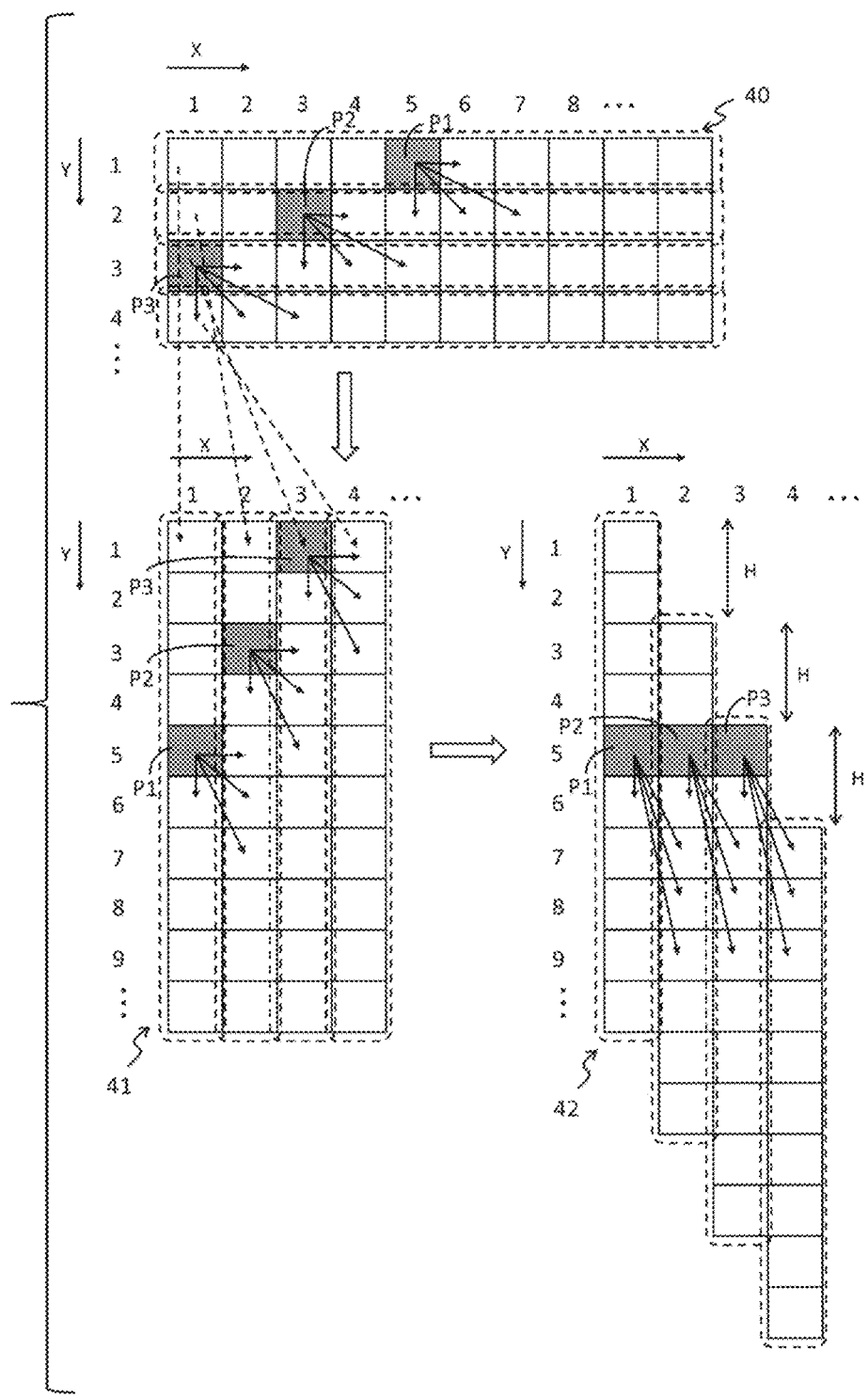
FIG. 5 is a diagram illustrating a flow of converting a pixel array for the image data in FIG. 2A.

FIG. 5 illustrates a state in which pixel array in the image data 40 in FIG. 2A is converted. There is no difference between the image data 40 in FIG. 2A and the image data 40 in FIG. 5. However, in FIG. 5, a coordinate indicating a position of a pixel both in the X-axis direction and the Y-axis direction is also given. Further, FIG. 5 illustrates a state before performing multi-valuing with the error diffusion method, and hence all the pixels are indicated with solid lines. Further, similarly to FIG. 2A, in FIG. 5, a diffusion range with a certain pixel as a reference is indicated with arrows in the image data 40.

The row/column transpose unit 51a performs the row/column transpose processing for rotating and converting the pixel rows, which are aligned sequentially in the Y-axis direction, into pixel columns and aligning the pixel columns sequentially in the X-axis direction, in the image data 40. Image data 41 corresponds to image data obtained after subjecting the image data 40 to the row/column transpose processing. In other words, the row/column transpose unit 51a rotates a pixel row of Y=1 in the image data 40, and obtains a pixel column of X=1 in the image data 41. At this state, the pixel row of Y=1 is rotated so that a pixel (1, 1) being a leading pixel in the pixel row of Y=1 has the same coordinate after rotation. Further, the row/column transpose unit 51a rotates a pixel row of Y=2 in the image data 40, and obtains a pixel column of X=2 in the image data 41. At this state, the pixel row of Y=2 is rotated so that a pixel (1, 2) being a leading pixel in the pixel row of Y=2 is positioned at (X, Y)=(2, 1) after rotation. Similarly, the row/column transpose unit 51a rotates a pixel row of Y=3 in the image data 40, and obtains a pixel column of X=3 in the image data 41. The row/column transpose unit 51a rotates a pixel row of Y=4 in the image data 40, and obtains a pixel column of X=4 in the image data 41.

Subsequently, the image deformation unit 51b performs deformation processing for deforming the image data 41 after the row/column transpose processing in the Y-axis direction in accordance with a predetermined density error diffusion range. As illustrated in FIG. 2A and FIG. 5, the diffusion range is defined in advance in a state of the image data 40. The shifted-pixel-number calculation unit 54 calculates a shifted pixel number in accordance with the diffusion range so that the image deformation unit 51b performs the deformation processing. The shifted pixel number is a shifted amount in the Y-axis direction, which is required for causing the second target pixel to belong to the same pixel row as the first target pixel. In FIG. 5, the shifted pixel number is denoted with a reference symbol H. The shifted-pixel-number calculation unit 54 may be understood as a part of the conversion unit 51.

In the image data 40 in FIG. 2A and FIG. 5, the first target pixel and the second target pixel, for example, the target pixel P1 and the target pixel P2 are shifted from each other by two pixels in the X-axis direction. This indicates that, in the image data 41, the first target pixel and the second target pixel are shifted from each other in the Y-axis direction. Therefore, the shifted-pixel-number calculation unit 54 obtains the shifted pixel number H=2 through calculation. Further, the image deformation unit 51b shifts a pixel column in the image data 41 with respect to a pixel column adjacent to the pixel column in the −X direction by the shifted pixel number H in the +Y direction.

Note that a method of calculating the shifted pixel number H, which is performed by the shifted-pixel-number calculation unit 54, is described later with the description for FIG. 2B and FIG. 2C.

In FIG. 5, the image deformation unit 51b shifts the pixel column of X=2 in the image data 41 with respect to the pixel column of X=1 by two pixels in the +Y direction. Similarly, the pixel column of X=3 in the image data 41 is shifted with respect to the pixel column of X=2 by two pixels in the +Y direction, and the pixel column of X=4 in the image data 41 is shifted with respect to the pixel column of X=3 by two pixels in the +Y direction. As a result, the image data 41 is subjected to the deformation processing, and thus image data 42 is obtained. In other words, the image data 42 is obtained as a result of converting the pixel array in the image data 40. In the image data 42, the target pixels P1, P2, and P3 are serial in the same pixel row. This indicates a state in which the respective pieces of data of the target pixels P1, P2, and P3 are stored at the addresses aligned in a serial manner in the RAM 13.

A correspondence relationship between a diffusion source pixel and a diffusion destination pixel within a diffusion range defined in a state of the image data 40 is maintained even after pixel array conversion performed by the conversion unit 51. In FIG. 5, the arrows in the image data 41 and the image data 42 indicate that a correspondence relationship between a diffusion source pixel and a diffusion destination pixel is maintained even when the relative positions between the pixels are changed.

For example, description is given on a relationship between a pixel (5, 1) being the target pixel P1, and a pixel (6, 1), a pixel (5, 2), a pixel (6, 2), and a pixel (7, 2) that are diffusion destinations of a density error of the pixel (5, 1) in the image data 40 in FIG. 5. The pixel (5, 1) in the image data 40 is placed at (X, Y)=(1, 5) in a state of the image data 41 or the image data 42. Further, the pixel (6, 1) in the image data 40 is positioned at (X, Y)=(1, 6) in a state of the image data 41 or the image data 42. The pixel (5, 2) in the image data 40 is placed at (X, Y)=(2, 5) in a state of the image data 41, and is placed at (X, Y)=(2, 7) in a state of the image data 42. The pixel (6, 2) in the image data 40 is placed at (X, Y)=(2, 6) in a state of the image data 41, is placed at (X, Y)=(2, 8) in a state of the image data 42. The pixel (7, 2) in the image data 40 is placed at (X, Y)=(2, 7) in a state of the image data 41, and is placed at (X, Y)=(2, 9) in a state of the image data 42. Therefore, when the error diffusion processing unit 52 subjects the pixel (X, Y)=(1, 5) in the image data 42 to multi-valuing, a density error of the pixel is diffused to the pixels (X, Y)=(1, 6), (2, 7), (2, 8), (2, 9) in the image data 42.

The image data illustrated in FIG. 2A and FIG. 5 is part of the image data 40, 41, and 42.

Figure 6:
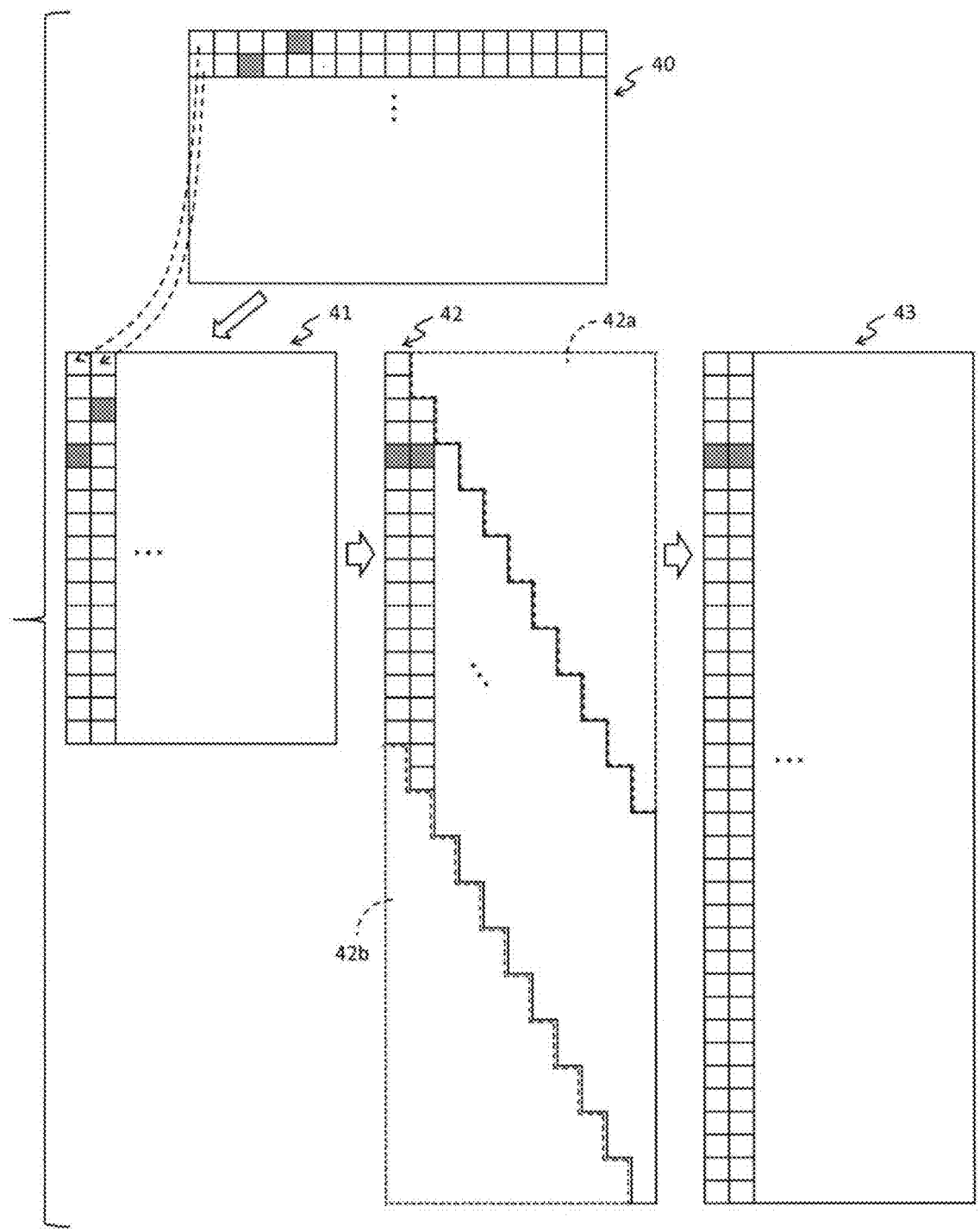
FIG. 6 is a diagram illustrating the flow of converting a pixel array and padding processing with the entire image data.

FIG. 6 shows pixel array conversion performed by the conversion unit 51 by illustrating the entire image data. As described above, the respective pixel rows in the image data 40 are subjected to the row/column transpose processing performed by the row/column transpose unit 51*a*, and thus the image data 41 is obtained. The respective pixel columns except for the pixel column of X=1 in the image data 41 are subjected to the deformation processing performed by the image deformation unit 51*b*, and thus the image data 42 is obtained. In FIG. 6, a pair of pixels corresponding to the relationship between the first target pixel and the second target pixel such as the target pixels P1, P2 is illustrated in gray.

Further, the image deformation unit 51*b* performs padding processing for filling a region with pixels having a predetermined value. The region is generated due to shifting between the pixel columns in the Y-axis direction in the image data 42 after the deformation processing. The image data 42 has a parallelogram-like shape as a whole because each of the pixel columns is shifted in the Y-axis direction. Thus, when the image data 42 is compared with image data in a bitmap format, which is stored in a memory based on assumption that the image data generally has a rectangular shape, triangular difference regions 42*a*, 42*b*, which are surrounded with broken lines in FIG. 6, are formed.

In view of this, the image deformation unit 51*b* performs the padding processing for filing those regions 42*a*, 42*b* with pixels having a predetermined value, in this case, a tone value of 0. The image data 42 is shaped through the padding processing, and thus image data 43 having a rectangular shape as a whole is obtained. In the following description, for convenience, a pixel that is added during the padding processing is also referred to as a "padding pixel", and a pixel that is already present in the image data 40 and the image data 41 is also referred to as a "real pixel".

4. Method of Calculating Shifted Pixel Number H

Figure 2B:
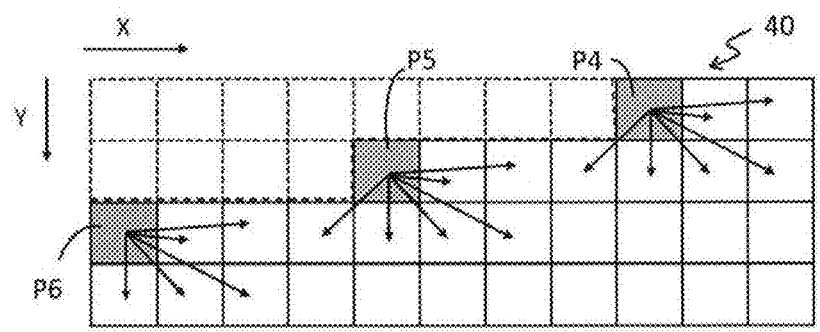
Figure 2C:
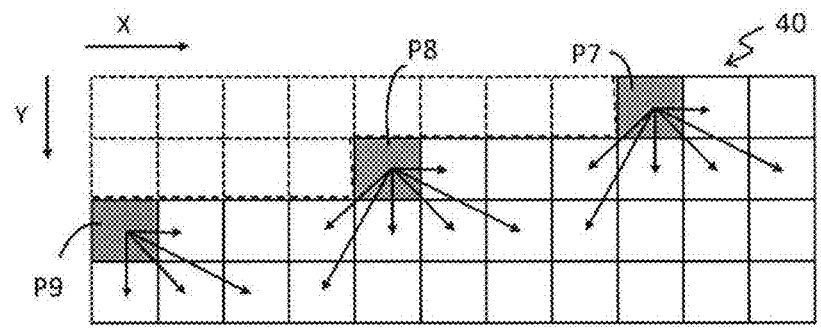

Similarly to FIG. 2A, FIG. 2B and FIG. 2C illustrate part of the image data 40. A way of regarding FIG. 2B and FIG. 2C is the same as that of FIG. 2A. FIG. 2A, FIG. 2B, and FIG. 2C have definitions of the diffusion range that are different from one another. In other words, any one of the definitions of the diffusion range that are given as examples in FIG. 2A, FIG. 2B, and FIG. 2C may be adopted, and examples other than FIG. 2A, FIG. 2B, and FIG. 2C may be adopted.

In the example of FIG. 2B, a density error generated in one pixel is distributed to, with the pixel as a reference, a pixel adjacent to the pixel in the +X direction, a pixel at a position away from the pixel by two pixels in the +X direction, a pixel at a position away from the pixel by one pixel in the −X direction and the +Y direction, a pixel adjacent to the pixel in the +Y direction, a pixel at a position away from the pixel in the +X direction and the +Y direction, and a pixel at a position away from the pixel by two pixels in the +X direction and one pixel in the +Y direction.

In the example of FIG. 2C, a density error generated in one pixel is distributed to, with the pixel as a reference, a pixel adjacent to the pixel in the +X direction, a pixel at a position away from the pixel by one pixel in the −X direction and the +Y direction, a pixel adjacent to the pixel in the +Y direction, a pixel at a position away from the pixel by one pixel in the +X direction and the +Y direction, a pixel at a position away from the pixel by two pixels in the +X direction and one pixel in the +Y direction, and a pixel at a position away from the pixel by one pixel in the −X direction and two pixels in the +Y direction.

In the example of FIG. 2B, the processor is capable of performing parallel multi-valuing for target pixels P4, P5, and P6 with determined density errors to be diffused. In the example of FIG. 2B, a relationship between the target pixels P4, P5 corresponds to the relationship between the first target pixel and the second target pixel. Similarly, a relationship between the target pixels P5, P6 corresponds to the relationship between the first target pixel and the second target pixel. In the example of FIG. 2C, the processor is capable of performing parallel multi-valuing for target pixels P7, P8, and P9 with determined density errors to be diffused. In the example of FIG. 2C, a relationship between the target pixels P7, P8 corresponds to the relationship between the first target pixel and the second target pixel. Similarly, a relationship between the target pixels P8, P9 corresponds to the relationship between the first target pixel and the second target pixel. As a matter of course, in the present exemplary embodiment, instead of directly performing multi-valuing for the pixel array as in FIG. 2B and FIG. 2C, the processor performs multi-valuing for the image data obtained after the conversion unit 51 converts the pixel array in the image data 40.

The shifted-pixel-number calculation unit 54 takes those various examples for the definition of the diffusion range into consideration. Thus, in the image data 40 before the row/column transpose processing, a pixel row to which one target pixel belongs is regarded as a first pixel row, and a pixel row, which is most distant from the first pixel row in the +Y direction within a diffusion range with the target pixel as a reference, is regarded as an N-th pixel row. Here, N is an integer of 2 or greater, and n is an integer from 1 to N−1. Further, the shifted-pixel-number calculation unit 54 regards, as the shifted pixel number H, a maximum value obtained by adding 1 to a sum of a pixel number in an n-th pixel row in the +X direction within the diffusion range with the target pixel as a reference and a pixel number in an n+1-th pixel row in the −X direction within the diffusion range.

In the diffusion range illustrated in FIG. 2A, N=2 and n=1. Thus, when 1 is added to a sum of 1 being a pixel number in the first pixel row in the +X direction within the diffusion range and 0 being a pixel number in the second pixel row in the −X direction within the diffusion range, 1+0+1=2. Thus, the shifted pixel number H=2.

In the diffusion range illustrated in FIG. 2B, N=2 and n=1 are given. Thus, when 1 is added to a sum of 2 being a pixel number in the first pixel row in the +X direction within the diffusion range and 1 being a pixel number in the second pixel row in the −X direction within the diffusion range, 2+1+1=4. Thus, the shifted pixel number H=4.

In the diffusion range illustrated in FIG. 2C, N=3 and n=1 or 2. Thus, when n=1 and 1 is added to a sum of 1 being a pixel number in the first pixel row in the +X direction within the diffusion range and 1 being a pixel number in the second pixel row in the −X direction within the diffusion range, 1+1+1=3. Further, when n=2 and 1 is added to a sum of 2 being a pixel number in the first pixel row in the +X direction within the diffusion range and 1 being a pixel number in the third pixel row in the −X direction within the diffusion range, 2+1+1=4. Therefore, in the diffusion range illustrated in FIG. 2C, the shifted-pixel-number calculation unit 54 determines that the shifted pixel number H=4.

The shifted-pixel-number calculation unit 54 obtains the shifted pixel number H through the calculation method described above. With this, the shifted pixel number H required for causing the first target pixel and the second target pixel to belong to the same pixel row after the row/column transpose processing can be obtained. Here, the first target pixel and the second target pixel are in such a positional relationship that the diffusion ranges with themselves as references do not overlap with each other. Depending on a definition of the diffusion range, N may be 4 or greater. Similarly, in this case, a maximum value among values calculated based on the above-mentioned calculation method while changing n within the range from 1 to N−1 may be regarded as the shifted pixel number H.

5. From Error Diffusion Processing to Data Output

Figure 7:
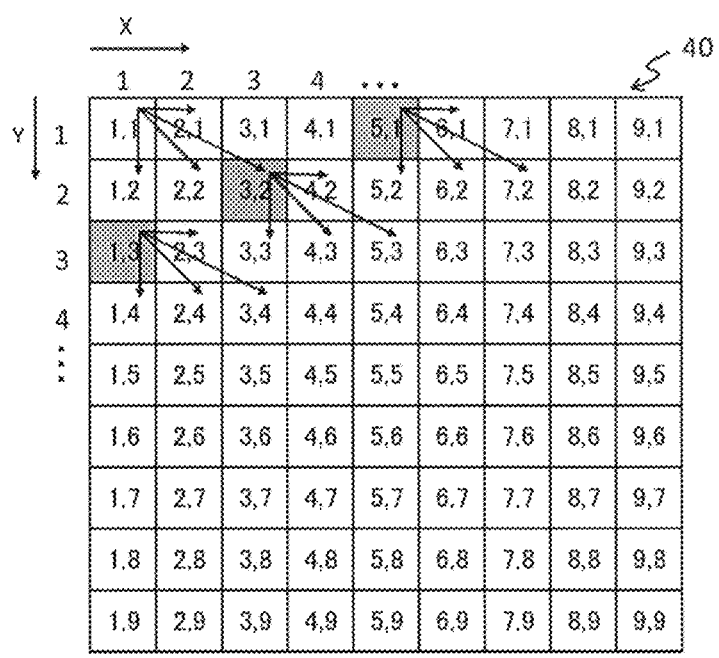
FIG. 7 is a diagram illustrating image data before conversion of pixel array.

FIG. 7 illustrates the image data 40. In the example of FIG. 7, for want of space, the image data 40 includes 81 pixels (9×9). In FIG. 7, the diffusion range illustrated in FIG. 2A, FIG. 5, and FIG. 6 is also adopted. Further, in FIG. 7 and FIG. 8 to FIG. 10 described later, similarly to FIG. 2A, FIG. 5, and FIG. 6, the plurality of target pixels with determined density errors to be diffused, which are simultaneously subjected to multi-valuing at a certain timing, are illustrated in gray. In FIG. 7, an XY coordinate is denoted in each pixel. According to the drawing, for example, it can be easily understood that a density error of a pixel (1, 3) is diffused to a pixel (2, 3), a pixel (1, 4), a pixel (2, 4), and a pixel (3, 4).

Figure 8:
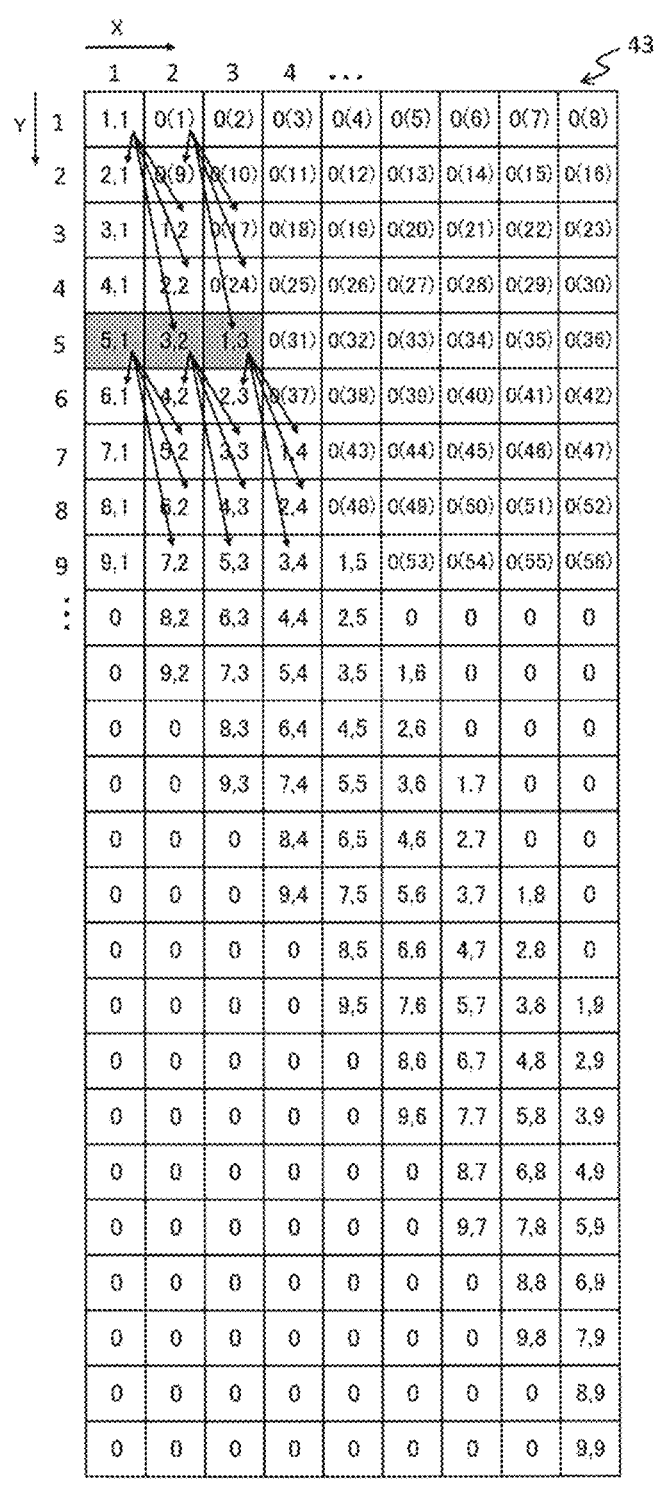

FIG. 8 illustrates the image data 43. The conversion unit 51 converts the pixel array in the image data 40 in FIG. 7, and thus the image data 43 is generated. All the padding pixels have a tone value of 0 as shown in FIG. 8. Further, in FIG. 8, in order to distinguish padding pixels from one another, some padding pixels are numbered in parentheses such as (1), (2), (3) . . . . In the following description, a padding pixel is denoted with a certain number in some cases, for example, a padding pixel 0(1).

Further, in FIG. 8, for convenience of description, an XY coordinate in each of the real pixels is not denoted with an XY coordinate in the image data 43, but denoted with an XY coordinate in the image data 40 before conversion performed by the conversion unit 51. In FIG. 8, for example, the pixel (7, 2) is a pixel positioned at (X, Y)=(7, 2) in the image data 40, and is positioned at (X, Y)=(2, 9) in the image data 43.

Figure 9:
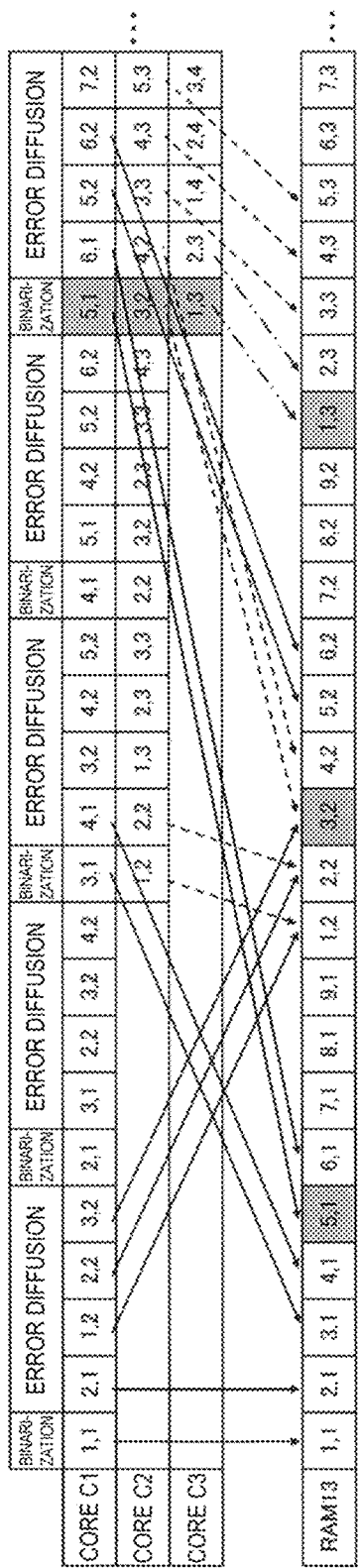
FIG. 9 is a diagram illustrating parallel multi-valuing processing performed by a plurality of cores for the image data in FIG. 7.

FIG. 9 is a diagram illustrating parallel multi-valuing processing through use of the plurality of cores for the image data 40 in FIG. 7. In the present exemplary embodiment, the error diffusion processing unit 52 performs for the image data 43 in place of the image data 40. Thus, FIG. 9 illustrates a comparative example with respect to the present exemplary embodiment. FIG. 9 illustrates pixels being respective processing targets of the plurality of cores C1, C2, C3, in accordance with the cores and a processing order. Further, FIG. 9 illustrates a state in which the data on the respective pixels in the image data 40 are stored at the serial addresses in the RAM 13 in the order of coordinates.

In FIG. 9, first, the core C1 accesses to the RAM 13, and binarizes data on the pixel (1, 1) being a first pixel in the order of coordinates. Subsequently, in order to diffuse a density error generated from binarization of the pixel (1, 1), the core C1 accesses to the RAM 13, and distributes the density error sequentially to a pixel (2, 1), a pixel (1, 2), a pixel (2, 2), and pixel (3, 2) being diffusion destinations. In FIG. 9, solid line arrows indicate part of the accesses from the core C1 to the respective addresses in the RAM 13.

The core C1 continues binarization and error distribution along with the binarization with respect to the pixels in the pixel row to which the pixel (1, 1) belongs. When the pixel (3, 1) is binarized, the core C2 starts binarization of the pixel (1, 2). Further, each of the cores C1 and C2 continues binarization and error diffusion. When the core C1 performs binarization of the pixel (5, 1), and the core C2 performs binarization of the pixel (3, 2), the core C3 starts binarization of the pixel (1, 3). In FIG. 9, broken-line arrows indicate part of the accesses from the core C2 to the respective addresses in the RAM 13, and two-dot chain line arrows indicate part of the accesses from the core C3 to the respective addresses in the RAM 13.

Here, description is made on timing at which the core C1 accesses to data on the pixel (5, 1). At the same timing, the core C2 is to access to data on the pixel (3, 2), and the core C3 is to access to data on the pixel (1, 3). However, the respective pieces of data of the pixel (5, 1), the pixel (3, 2), and the pixel (1, 3) are at the addresses scattered away from one another in the RAM 13. Thus, as described above, access efficiency from the memory controller 17 to the RAM 13 is degraded, and the cores C1, C2, and C3 are forced to be in a stand-by mode for a longer time period for reading/ writing of respective required data. After this, when the cores C1, C2, and C3 are to perform parallel error diffusion for the respective addresses scattered in the RAM 13, a similar problem relating to access speed reduction is also caused. Such problem relating to access speed reduction is more noticeable as a greater number of cores are to perform parallel multi-valuing processing.

Figure 10:
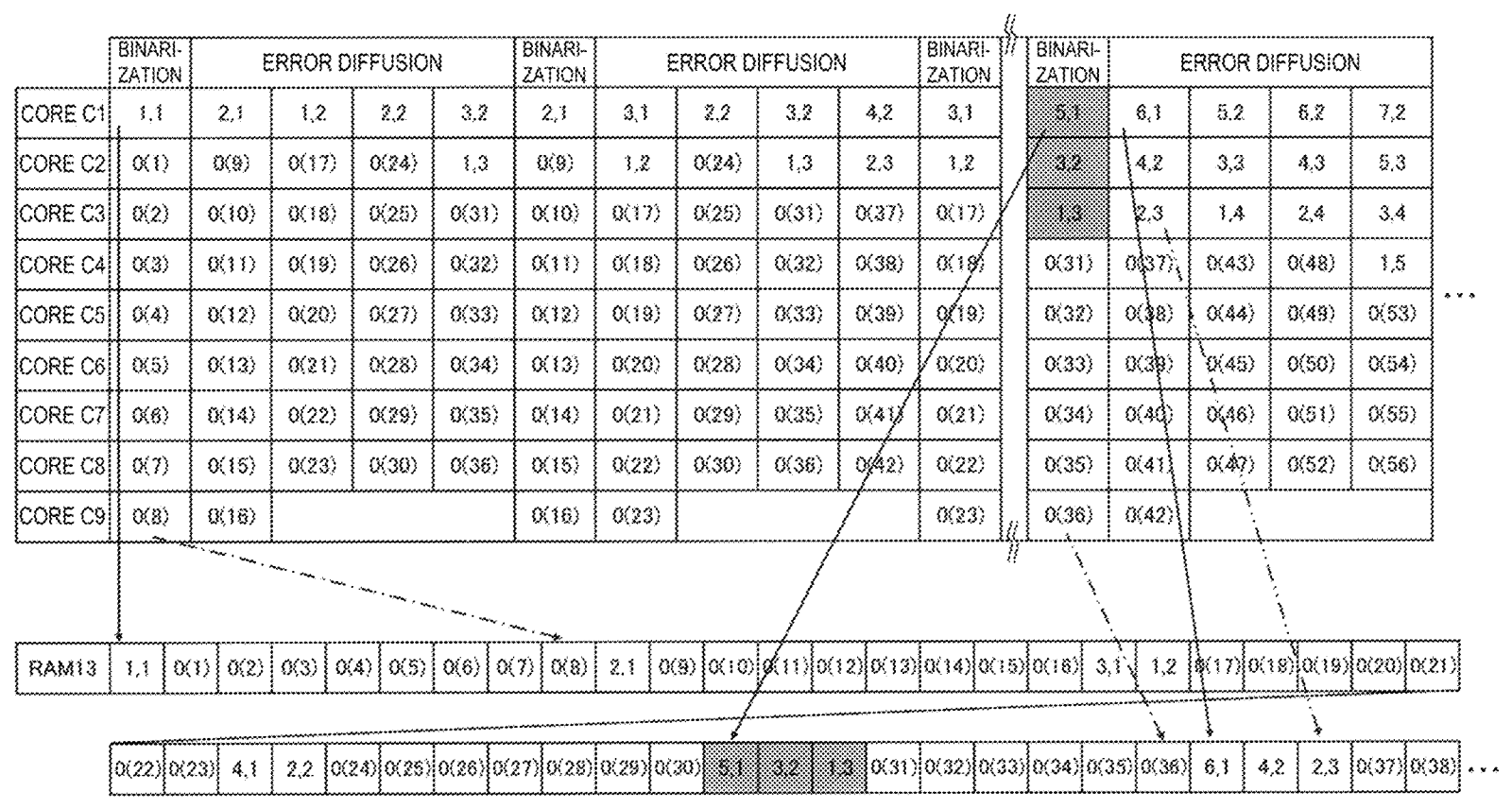

FIG. 10 is a diagram illustrating parallel multi-valuing processing through use of the plurality of cores for the image data 43 in FIG. 8. The error diffusion processing unit 52 achieves an error diffusion processing step for performing parallel multi-valuing with the error diffusion method for the plurality of target pixels, using the plurality of multi-valuing units. Here, the multi-core processor 15 as the error diffusion processing unit 52 includes cores as many as or more than the number of pixel columns in the image data 43. Among the plurality of cores, cores C1, C2, C3, C4, C5, C6, C7, C8, and C9 that are as many as the number of pixel columns in the image data 43 perform parallel processing. FIG. 10 illustrates pixels being respective processing targets of the cores C1 to C9 in accordance with the cores and a processing order.

Further, FIG. 10 illustrates a state in which the data on the respective pixels in the image data 43 are stored at the serial addresses in the RAM 13 in the order of coordinates of the pixels. In the RAM 13 in FIG. 10, the real pixels among the pixels aligned at the serial addresses in the order of coordinates in the image data 43 are denoted with the XY coordinates in the image data 40 similarly to FIG. 8, in place of the XY coordinates in the image data 43.

In FIG. 10, first, the cores C1 to C9 access to the RAM 13, and perform parallel binarization for the data on the respective pixels forming the first pixel row in the image data 43. In other words, the core C1 binarizes he pixel (1, 1) being the first pixel in the coordinate order. In parallel with this, the core C2 binarizes a padding pixel 0(1), the core C3 binarizes a padding pixel 0(2), the core C4 binarizes a padding pixel 0(3), the core C5 binarizes a the padding pixel 0(4), the core C6 binarizes a padding pixel 0(5), the core C7 binarizes a padding pixel 0(6), the core C8 binarizes a padding pixel 0(7), and the core C9 binarizes a padding pixel 0(8).

In response to requests from the cores C1 to C9, the memory controller 17 accesses to the data on the pixel (1, 1) and the padding pixels 0(1) to 0(8) that are stored in the RAM 13. Here, the pixel (1, 1) and the padding pixels 0(1) to 0(8) are stored at the serial addresses in the RAM 13. Thus, the memory controller 17 is capable of reading out the data on the pixel (1, 1) to the padding pixel 0(8) for a time period shorter than that in a case in which the data are not stored at the serial addresses, and is capable of delivering the required data on the pixels to the respective cores C1 to C9. Further, at the time of writing, the memory controller 17 is capable of writing the data on the respective pixels received from the cores C1 to C9 into the serial addresses from the pixel (1, 1) to the padding pixel 0(8) in a serial manner for a shorter time period. In FIG. 10, parts of the accesses from the respective cores to the respective addresses in the RAM 13 are indicated with the solid line arrows and the like. For easy understanding of illustration, most of the arrows are omitted.

Subsequently, in order to diffuse density errors generated through binarization of the pixel (1, 1) to the padding pixel 0(8), the cores C1 to C9 access to the RAM 13, and distribute the density errors to the pixels being diffusion destinations. In other words, in order to diffuse the density error generated through binarization of the pixel (1, 1), the core C1 accesses to the pixel (2, 1) being one of the diffusion destinations from the pixel (1, 1). In parallel with this, the core C2 accesses to the padding pixel 0(9), the core C3 accesses to the padding pixel 0(10), the core C4 accesses to the padding pixel 0(11), the core C5 accesses to the padding pixel 0(12), the core C6 accesses to the padding pixel 0(13), the core C7 accesses to the padding pixel 0(14), the core C8 accesses to the padding pixel 0(15), and the core C9 accesses to the padding pixel 0(16). In this case, the pixel (2, 1) and the padding pixels 0(9) to 0(16) are stored at the serial addresses in the RAM 13. Thus, in response to requests from the cores C1 to C9, the memory controller 17 is capable of efficiently accessing to the pixel (2, 1) to the padding pixel 0(16).

As described above, the cores C1 to C9 performs binarization and error diffusion along with the binarization for the respective pixels in a parallel manner, while dealing with the pixel rows forming the image data 43 collectively. With this, the processing is performed as illustrated in FIG. 10. Note that a padding pixel is not present in the image data 40, 41, 42. Thus, by following the diffusion range that is already determined in the image data 40, a density error is not diffused from a real pixel to a padding pixel. Further, a padding pixel has a tone value of 0, and hence dot-off is given as a result of multi-valuing. Thus, there is no density error between the tone value and the multi-valuing result. In other words, a density error is diffused from a padding pixel to another padding pixel, but a density error is not generated at a padding pixel at all. Thus, as a result of multi-valuing with the error diffusion method, determination as dot-off is given to all the padding pixels. Further, in actuality, a density error diffused to a padding pixel to a real pixel is 0. Thus, the program 16 may be configured so that multi-valuing and error diffusion for a padding pixel are omitted.

As illustrated in FIG. 10, at a certain timing, the cores C1 to C9 in operation performs binarization for the pixel row including the pixel (5, 1) in the image data 43. In other words, the cores C1 to C9 access to the pixel (5, 1), the pixel (3, 2), the pixel (1, 3), and padding pixels 0(31) to 0(36), respectively, which are stored at the serial addresses in the RAM 13, in a parallel manner, and perform binarization. As a matter of course, when the pixel (5, 1) is regarded as the first target pixel, the pixel (3, 2) can be regarded as the second target pixel. When the pixel (3, 2) is regarded as the first target pixel, the pixel (1, 3) can be regarded as the second target pixel.

After that, as illustrated in FIG. 10, the core C1 accesses to the pixel (6, 1) being one of the diffusion destinations, and delivers a density error generated through binarization of the pixel (5, 1) thereto. In parallel with this, the core C2 accesses to a pixel (4, 2) being one of the diffusion destinations and delivers a density error generated through binarization of the pixel (3, 2) thereto, and the core C3 accesses to the pixel (2, 3) being one of the diffusion destinations and delivers a density error generated through binarization of the pixel (1, 3) thereto. The pixel (6, 1), the pixel (4, 2), and the pixel (2, 3) are also stored at the serial addresses in the RAM 13. Thus, efficient access can be achieved. After completing binarization for the last pixel low including a pixel (9, 9) as the last pixel illustrated in FIG. 8, the error diffusion processing unit 52 terminates multi-valuing with the error diffusion method for the image data 43.

The conversion unit 51 performs reverse conversion for the image data 43 after multi-valuing performed by the error diffusion processing unit 52. In this case, the image deformation unit 51*b* performs deformation processing reverse to the deformation processing described above. In other words, the image deformation unit 51*b* removes the padding pixels from the image data 43 after multi-valuing, and then cancels entire shifting between the pixel columns in the Y-axis direction by the shifted pixel number H. With this, the image data having the same shape as the image data 41 is obtained.

Moreover, the row/column transpose unit 51*a* performs row/column transpose processing reverse to the row/column transpose processing described above for the image data after reverse deformation processing performed by the image deformation unit 51*b*. With this, the pixel array in the image data after multi-valuing is returned the same pixel array in the image data 40. In other words, in the image data after reverse deformation processing performed by the image deformation unit 51b, the row/column transpose unit 51a rotate the pixel columns, which are sequentially aligned in the X-axis direction, in a direction opposite to that in the row/column transpose processing described above, converts the pixel columns to the pixel rows, and align the pixel rows sequentially in the Y-axis direction.

Further, the data output unit 53 outputs the image data, which includes the pixel array returned to the original by the conversion unit 51, to a predetermined output destination. In FIG. 1, the predetermined output destination is the printer 20 to which the image processing apparatus 10 is coupled via the communication IF 14. In other words, the printer 20 acquires the image data output from the data output unit 53 as printing data, and ejects dots of CMYK ink according to the printing data. In this manner, printing on a printing medium is performed. However, the output destination of the image data from the data output unit 53 is not limited to the printer 20, and may be a monitor performing image display according to the image data, a server that stores the image data, or the like.

6. Processing Involving Division of Image Data

The conversion unit 51 may divide the image data 41 after the row/column transpose processing into a plurality of regions in the X-axis direction, and may perform the deformation processing for each of the plurality of regions. The error diffusion processing unit 52 may perform multi-valuing for each of the plurality of regions. Processing involving such division of the image data is described with reference to FIG. 11 and FIG. 12.

Figure 11:
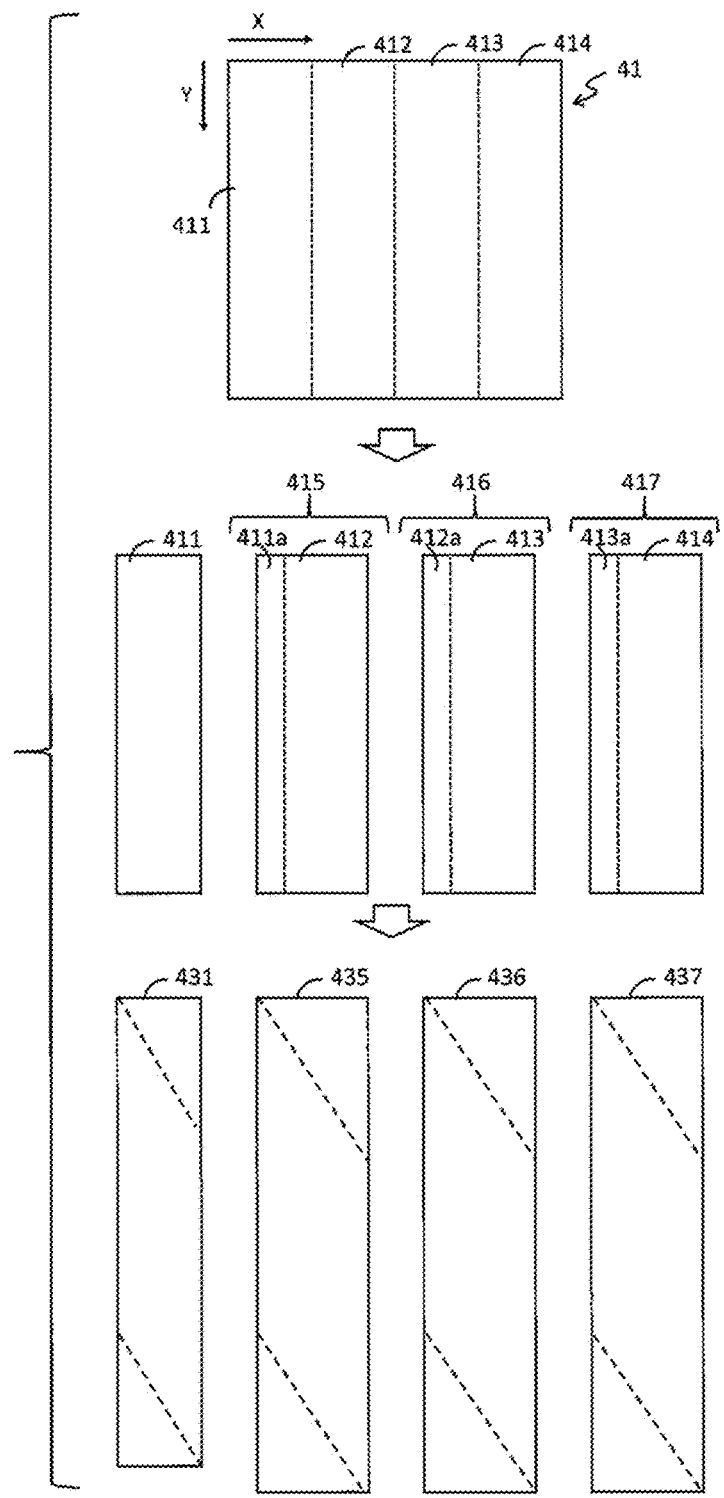
FIG. 11 is a diagram illustrating a part of a flow of processing involving division of image data.

In the example of FIG. 11, the conversion unit 51 divides the image data 41 after the row/column transpose processing into four regions 411, 412, 413, and 414 in the X-axis direction. It can be understood that this division is performed evenly or substantially evenly. As a matter of course, the division number is not limited to four.

Subsequently, the conversion unit 51 generates enlarged regions 415, 416, and 417 from the regions 411, 412, 413, and 414. Here, among the regions 411, 412, 413, and 414, the region 412 being the second region from the −X direction to the +X direction is described. The conversion unit 51 regards a region including the region 412 and a partial region 411a as the enlarged region 415. The partial region 411a is a part of the region 411 adjacent to the region 412 in the −X direction, and is continuous with the region 412. In other words, the conversion unit 51 copies a region of the region 411, which extends along the boundary line with the region 412 and has a predetermined width in the X-axis direction, and joins the copied region as the partial region 411a to a side of the region 412 in the −X direction. With this, the enlarged region 415 is generated. As a result, the partial region 411a is present both in the region 411 and the enlarged region 415.

Similarly, the conversion unit 51 regards a region including the region 413 and a partial region 412a as the enlarged region 416. Among the regions 411, 412, 413, and 414, the region 413 is the third region from the −X direction to the +X direction. The partial region 412a is a part of the region 412 adjacent to the region 413 in the −X direction, and is a continuous with the region 413. Similarly, the conversion unit 51 regards a region including the region 414 and a partial region 413a as the enlarged region 417. Among the regions 411, 412, 413, and 414, the region 414 is on an endmost side in the +X direction. The partial region 413a is a part of the region 413 adjacent to the region 414 in the −X direction, and is continuous with the region 414. The partial region 412a is present both in the region 412 and the enlarged region 416, and the partial region 413a is present both in the region 413 and the enlarged region 417.

The image deformation unit 51b of the conversion unit 51 regards each one of the region 411, the enlarged region 415, the enlarged region 416, and the enlarged region 417 as one piece of image data, and performs the deformation processing using the shifted pixel number H. In other words, the image deformation unit 51b deforms the region 411 so that the adjacent pixel columns are shifted in the Y-axis direction by the shifted pixel number H, and generates divided image data 431 having a rectangular shape by filling a difference region generated through this deformation with padding pixels. A procedure of deforming the region 411 and generating the divided image data 431 is the same as the procedure of generating the image data 43 from the image data 41, which is described in FIG. 6. Similarly, the image deformation unit 51b deforms the enlarged region 415 so that the adjacent pixel columns are shifted in the Y-axis direction by the shifted pixel number H, and generates divided image data 435 having a rectangular shape by filling a difference region generated through this deformation with padding pixels. Similarly, the image deformation unit 51b generates divided image data 436 from the enlarged region 416, and generates divided image data 437 from the enlarged region 417.

Two oblique broken lines given for each of the divided image data 431, 435, 436, and 437 are boundary lines between real pixels and padding pixels. Note that, with reference to the image data 42 in FIG. 6, the boundary line between the real pixels and the padding pixels is has a step-like shape. However, in FIG. 11, the boundary line between the real pixels and the padding pixel is illustrated as a linear line in a simplified manner.

Figure 12:
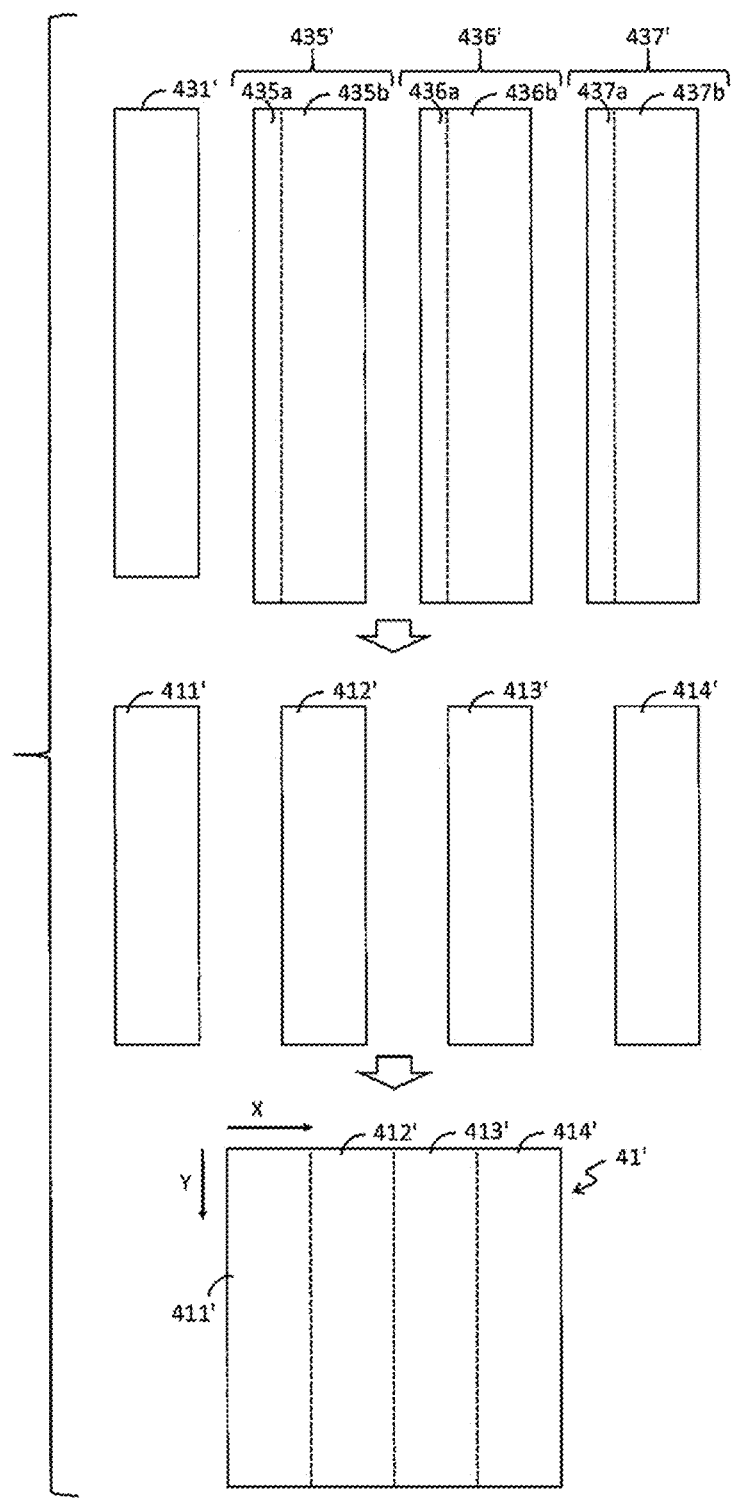
FIG. 12 is a diagram illustrating a sequel to FIG. 11 in the flow of processing involving division of image data.

The error diffusion processing unit 52 performs multi-valuing with the error diffusion method for each of the divided image data 431, 435, 436, and 437 as a target. In other words, similarly to multi-valuing for the image data 43, multi-valuing for the divided image data 431 is performed through parallel processing by the plurality of cores. Similarly, each of the divided image data 435, 436, 437 is regarded as one piece of image data, and is subjected to multi-valuing. FIG. 12 illustrates divided image data 431' obtained as a result of multi-valuing for the divided image data 431, divided image data 435' obtained as a result of multi-valuing for the divided image data 435, divided image data 436' obtained as a result of multi-valuing for the divided image data 436, and divided image data 437' obtained as a result of multi-valuing for the divided image data 437.

In this manner, multi-valuing is performed for each region obtained by dividing the image data 41. With this, a size of the image data subjected to multi-valuing can be significantly reduced. Here, the pixel number in the Y-axis direction in the pixel data after deformation based on the shifted pixel number H is a pixel number obtained by adding (pixel column number−1)×H to a pixel number forming one pixel column before deformation. For example, the image data 41 has a size of 8,000 pixels×8,000 pixels, and the shifted pixel number H=2. In this case, as illustrated in FIG. 6, when the entire image data 41 is to be deformed, the pixel number in the Y-axis direction in the image data 42, 43 is approximately 24,000, which is three times as great as the pixel number before deformation. When the shifted pixel number H is greater, the pixel number in the Y-axis direction in the image data 42, 43 is further increased.

Meanwhile, as in the example of FIG. 11, when the image data 41 is divided into four parts in the X-axis direction, the pixel column number of the region 411 being one part in the X-axis direction is 2,000. When the shifted pixel number H=2, the pixel number in the Y-axis direction in the divided image data 431 is approximately 12,000. This number is a half of the pixel number in the Y-axis direction in the image data 42, 43. Because of the partial regions 411a, 412a, 413a, each of the enlarged regions 415, 416, 417 has a pixel column number in the X-axis direction that is greater than that of the region 411 by several tens of columns, for example. Thus, the pixel number in the Y-axis direction in each of the divided image data 435, 436, 437 is greater than the divided image data 431. Still, the pixel number is somewhere around the number obtained by adding several tens to hundreds of pixels to 12,000 pixels. Further, the total of the pixel numbers in the X-axis direction in the divided image data 431, 435, 436, 437 is somewhere around the number obtained by adding several tens of pixels×3 to 8,000. Therefore, the total of the pixel numbers in the divided image data 431, 435, 436, 437 is much less than the pixel number in the image data 43 (8,000×approximately 24,000). When multi-valuing is performed for the divided image data 431, 435, 436, 437, a load of the error diffusion processing unit 52 can be alleviated, and consumption of the memory can be suppressed.

As described above, a difference between the pixel number in the image data subjected to multi-valuing when the image data 41 is divided and the pixel number when the image data 41 is not divided substantially corresponds to the number of padding pixels. When the division number of the image data 41 is increased, the padding pixels can be further reduced.

The divided image data 435' illustrated in FIG. 12 can be divided into a region 435b and a region 435 a. The region 435b is data obtained by performing multi-valuing for real pixels forming the region 412 in the enlarged region 415 and some padding pixels in the divided image data 435. The region 435a is data obtained by performing multi-valuing for real pixels forming the partial region 411a and some padding pixels in the divided image data 435. Similarly, the divided image data 436' can be divided into a region 436b and a region 436a. The region 436b is data obtained by performing multi-valuing for real pixels forming the region 413 in the enlarged region 416 and some padding pixels in the divided image data 436. The region 436a is data obtained by performing multi-valuing for real pixels forming the partial region 412a and some padding pixels in the divided image data 436. Similarly, the divided image data 437' can be divided into a region 437b and a region 437a. The region 437b is data obtained by performing multi-valuing for real pixels forming the region 414 in the enlarged region 417 and some padding pixels in the divided image data 437. The region 437a is data obtained by performing multi-valuing for real pixels forming the partial region 413a and some padding pixels in the divided image data 437.

The region 435a of the divided image data 435', the region 436a of the divided image data 436', and the region 437a of the divided image data 437' overlap with part of the divided image data 431', part of the region 435b of the divided image data 435', and part of the region 436b of the divided image data 436', which are thus unnecessary data as a result of multi-valuing. Therefore, the error diffusion processing unit 52 delivers, to the conversion unit 51, the divided image data 431', the region 435b of the divided image data 435', the region 436b of the divided image data 436', and the region 437b of the divided image data 437' as image data after multi-valuing. When one of the plurality of regions 411, 412, 413, and 414 is regarded as a target region, the error diffusion processing unit 52 subjects a region (enlarged region) to multi-valuing as described above. The region includes a partial region, which is a part in a region adjacent to the target region in the −X direction and is continuous with the target region, and the target region. Further, data relating to the target region after multi-valuing for the enlarged region is regarded as part of the image data after multi-valuing.

In this manner, while being deformed to the divided image data 435, the enlarged region 415 obtained by adding the partial region 411a to the region 412 is subjected to multi-valuing with the error diffusion method. With this, a density error, which is generated through multi-valuing for each of the pixels in the partial region 411a, can be diffused to each of the pixels close to the partial region 411a in the region 412. Thus, the divided image data 431' and the region 435b in the divided image data 435' are joined naturally, and a joint part therebetween is not noticeable. Note that, as described later, actual joining is performed at timing when regions 411', 412', 413', and 414' are obtained.

Similarly, multi-valuing with the error diffusion method is performed for the enlarged region 416. With this, a density error, which is generated through multi-valuing for each of the pixels in the partial region 412a, can be diffused to each of the pixels close to the partial region 412a in the region 413. When the region 435b in the divided image data 435' and the region 436b in the divided image data 436' are joined, a joint part therebetween is not noticeable. Similarly, multi-valuing with the error diffusion method is performed for the enlarged region 417. With this, a density error, which is generated through multi-valuing for each of the pixels in the partial region 413a, can be diffused to each of the pixels close to the partial region 413a in the region 414. When the region 436b in the divided image data 436' and the region 437b in the divided image data 437' are joined, a joint part therebetween is not noticeable.

In the conversion unit 51 that acquires, from the error diffusion processing unit 52, the divided image data 431', the region 435b of the divided image data 435', the region 436b of the divided image data 436', and the region 437b of the divided image data 437', the image deformation unit 51b performs the deformation processing reverse to the deformation processing described above using the shifted pixel number H. In other words, the image deformation unit 51b removes padding pixels from each of the divided image data 431', the region 435b, the region 436b, and the region 437b, and cancels shifting between the adjacent pixel columns based on the shifted pixel number H. As a result, as illustrated in FIG. 12, the divided image data 431' is deformed to the region 411', the region 435b is deformed to the region 412', the region 436b is deformed to the region 413', and the region 437b is deformed to the region 414'.

The regions 411', 412', 413', and 414' are image data having the same size as the regions 411, 412, 413, and 414, respectively. The image deformation unit 51b joins those regions 411', 412', 413', and 414', and acquires image data 41' having the same shape as the image data 41. The row/column transpose unit 51a is only required to subject the image data 41' to the row/column transpose processing reverse to the row/column transpose processing described above.

7. Conclusion

As described above, according to the present exemplary embodiment, when image data including a plurality of pixels arrayed two-dimensionally in a first direction and a second direction intersecting with each other is input, and multi-valuing is performed for the image data that is input, with an error diffusion method of diffusing a density error generated at the time of multi-valuing for a pixel to peripheral pixels before multi-valuing, the image processing apparatus 10 performs parallel multi-valuing with the error diffusion method for a plurality of target pixels while regarding, among the pixels before multi-valuing, a plurality of pixels with the density error diffused from another pixel that are determined as the plurality of target pixels. The image processing apparatus 10 includes the memory that stores the input image data, the error diffusion processing unit 52 including the plurality of multi-valuing units performing parallel multi-valuing with the error diffusion method for the plurality of target pixels, and the conversion unit 51 that converts the pixel array in the image data. Further, When a pixel that belongs to one pixel row being a pixel line along the first direction in the image data before conversion by the conversion unit 51 and is a processing target of a first multi-valuing unit being one of the plurality of multi-valuing units is regarded as a first target pixel, and a pixel that belongs to a pixel row adjacent in the second direction to the pixel row to which the first target pixel belongs in the image data before conversion by the conversion unit 51 is a processing target of a second multi-valuing unit being one of the plurality of multi-valuing units is regarded as a second target pixel, the conversion unit 51 converts the pixel array in the image data so that the first target pixel and the second target pixel are stored at serial addresses in the memory. The error diffusion processing unit 52 performs multi-valuing by the first multi-valuing unit for the first target pixel in the image data after conversion by the conversion unit 51 and multi-valuing by the second multi-valuing unit for the second target pixel in the image data after conversion by the conversion unit 51 in a parallel manner.

According to the configuration, with respect to the image data in a state in which the first target pixel and the second target pixel are stored at serial addresses in the memory, the error diffusion processing unit 52 performs multi-valuing by the first multi-valuing unit for the first target pixel and multi-valuing by the second multi-valuing unit for the second target pixel in a parallel manner. Therefore, high-speed access to the plurality of target pixels whose relationship corresponds to the relationship between the first target pixel and the second target pixel stored in the memory can be achieved. Thus, acceleration due to parallel processing can be achieved through multi-valuing for the plurality of target pixels by using the plurality of multi-valuing units.

Further, according to the present exemplary embodiment, the conversion unit 51 converts the pixel array in the image data through row/column transpose processing and deformation processing. In the row/column transpose processing, pixel rows aligned sequentially in the second direction in the image data are respectively converted into pixel columns being lines of pixels along the second direction, and the respective pixel columns are sequentially aligned in the first direction. In the deformation processing, the image data after the row/column transpose processing is deformed in the second direction according to a diffusion range of the density error that is determined in advance.

According to the configuration, the conversion unit 51 performs the row/column transpose processing and the deformation processing. With this, the pixel array in the image data can be converted so that the first target pixel and the second target pixel are stored at serial addresses in the memory.

According to the description with reference to FIG. 5 and FIG. 6, the conversion unit 51 obtains the image data 41 by performing the row/column transpose processing for the image data 40, and obtains the image data 42 by performing the deformation processing for the image data 41. However, the conversion unit 51 is only required to convert the pixel array in the image data 40 into the pixel array in the image data 42 in the end. Thus, conversion of the pixel array is not necessarily required to follow the exact order as described in FIG. 5 and FIG. 6.

Further, according to the present exemplary embodiment, when, in the image data before the row/column transpose processing, a pixel row to which the target pixel belongs is regarded as a first pixel row, a pixel row that is most distant from the first pixel row in the second direction within the diffusion range with the target pixel as a reference is regarded as an N-th pixel row, N is of an integer of 2 or greater, and n is an integer from 1 to N−1, the conversion unit 51 regards, as the shifted pixel number H, a maximum value obtained by adding 1 to a sum of a pixel number in an n-th pixel row in the first direction within the diffusion range and a pixel number in an n+1-th pixel row in a direction opposite to the first direction within the diffusion range. Further, in the deformation processing, a pixel column in the image data after the row/column transpose processing is shifted in the second direction by the shifted pixel number H with respect to a pixel column adjacent to the pixel column in the direction opposite to the first direction.

According to the configuration, the conversion unit 51 is capable of obtaining the shifted pixel number H, which is required for the deformation processing for causing the first target pixel and the second target pixel to belong to the same pixel row, appropriately based on the diffusion range defined in the image data before the row/column transpose processing.

Further, according to the present exemplary embodiment, the conversion unit 51 returns the pixel array in the image data to the original pixel array by performing deformation processing reverse to the deformation processing for the image data after multi-valuing by the error diffusion processing unit 52 and performing row/column transpose processing reverse to the row/column transpose processing for the image data after the reverse deformation processing. Further, the image processing apparatus 10 outputs, to a predetermined output destination, the image data with the pixel array returned to the original pixel array by the conversion unit 51.

According to the configuration, after performing for multi-valuing for the image data with the pixel array that is converted for accelerating parallel processing of multi-valuing, the pixel array is returned to the original pixel array. In this state, the image processing apparatus 10 is capable of outputting the image data to an output destination such as the printer 20.

Further, according to the present exemplary embodiment, the conversion unit 51 shapes the image data before multi-valuing by the error diffusion processing unit 52 by performing padding processing for filling a region with a pixel having a predetermined value, the region being generated due to shifting between the pixel columns in the second direction in the image data after the deformation processing.

According to the configuration, the conversion unit 51 is capable of shaping the image data required for performing parallel multi-valuing by the plurality of multi-valuing units in an efficient manner.

Further, according to the present exemplary embodiment, the conversion unit 51 may divide the image data after the row/column transpose processing into a plurality of regions in the first direction, and may perform the deformation processing for each of the plurality of regions. The error diffusion processing unit 52 may perform multi-valuing for each of the plurality of regions.

According to the configuration, the conversion unit 51 can reduce an image size subjected to multi-valuing by the error diffusion processing unit 52.

Further, according to the present exemplary embodiment, when one of the plurality of regions is regarded as a target region, the error diffusion processing unit 52 performs multi-valuing for a region including a partial region and the target region, the partial region being a part of the region adjacent to the target region in the direction opposite to the first direction and being continuous with the target region. Among data after multi-valuing performed for the region including the partial region and the target region, data relating to the target region is regarded as part of the image data after multi-valuing by the error diffusion processing unit 52.

According to the configuration, the error diffusion processing unit 52 performs multi-valuing for the region including the partial region and the target region, and thus the target regions after multi-valuing can be naturally joined with each other.

In addition to the image processing apparatus 10 and the system 30, the present exemplary embodiment discloses a method performed by the apparatus or in the system and the program 16 causing the processor to perform the method.

When image data including a plurality of pixels arrayed two-dimensionally in a first direction and a second direction intersecting with each other is input, and multi-valuing is performed for the image data that is input, with an error diffusion method of diffusing a density error generated at the time of multi-valuing for a pixel to peripheral pixels before multi-valuing, the image processing method is for performing parallel multi-valuing with the error diffusion method for a plurality of target pixels while regarding, among the pixels before multi-valuing, a plurality of pixels with the density error diffused from another pixel that are determined as the plurality of target pixels. The image processing method includes a storing step for storing, in a memory, the image data being input, a converting step for converting a pixel array in the image data, and an error diffusion processing step for performing parallel multi-valuing with the error diffusion method for the plurality of target pixels, using a plurality of multi-valuing units. Further, in the converting step, when a pixel that belongs to one pixel row being a pixel line along the first direction in the image data before the converting step and is a processing target of a first multi-valuing unit being one of the plurality of multi-valuing units is regarded as a first target pixel, and a pixel that belongs to a pixel row adjacent in the second direction to the pixel row to which the first target pixel belongs in the image data before the converting step is a processing target of a second multi-valuing unit being one of the plurality of multi-valuing units is regarded as a second target pixel, the pixel array in the image data is converted so that the first target pixel and the second target pixel are stored at serial addresses in the memory. In the error diffusion processing step, multi-valuing by the first multi-valuing unit for the first target pixel in the image data after the converting step and multi-valuing by the second multi-valuing unit for the second target pixel in the image data after the converting step are performed in a parallel manner.

A supplement is further added to the description given above. In parallel processing performed by the plurality of cores, which is illustrated in FIG. 10, it is assumed that the number of cores of the multi-core processor 15 is smaller than the pixel column number in the image data 43 in FIG. 8. For example, as illustrated in FIG. 8, the pixel column number in the image data 43 is nine, and the multi-core processor 15 only includes the cores C1 to C5. In this case, the cores C1 to C5 perform binarization of the pixel (1, 1) and the padding pixels 0(1) to 0(4) that belong to the first pixel row and diffusion of a density error generated through binarization as illustrated in FIG. 10. After that, the cores C1 to C4 perform binarization of the padding pixels 0(5) to 0(8) that belong to the same first pixel row and diffusion of a density error generated through binarization. Similarly, the cores C1 to C5 perform binarization of the pixel (2, 1) and the padding pixels 0(9) to 0(12) in the pixel row to which the pixel (2, 1) belongs and diffusion of a density error generated through binarization as illustrated in FIG. 10. After that, the cores C1 to C4 perform binarization of the padding pixels 0(13) to 0(16) that belong to the same first pixel row and diffusion of a density error generated through binarization. Similarly, after this, the processing that is performed by the cores C6 to C9 in FIG. 10 is performed by the cores C1 to C4 instead.

What is claimed is:

1. An image processing apparatus that, when image data including a plurality of pixels arrayed two-dimensionally in a first direction and a second direction intersecting with each other is input, and multi-valuing is performed for the image data that is input, with an error diffusion method of diffusing a density error generated at the time of multi-valuing for a pixel to peripheral pixels before multi-valuing, is configured to perform parallel multi-valuing with the error diffusion method for a plurality of target pixels while regarding, among the pixels before multi-valuing, a plurality of pixels with the density error diffused from another pixel that are determined as the target pixels, the image processing apparatus comprising:

a memory configured to store the image data being input;

an error diffusion processing unit including a plurality of multi-valuing units configured to perform parallel multi-valuing with the error diffusion method for the plurality of target pixels; and a conversion unit configured to convert a pixel array in the image data, wherein when a pixel that belongs to one pixel row being a pixel line along the first direction in the image data before conversion by the conversion unit and is a processing target of a first multi-valuing unit being one of the plurality of multi-valuing units is regarded as a first target pixel, and a pixel that belongs to a pixel row adjacent in the second direction to the pixel row to which the first target pixel belongs in the image data before conversion by the conversion unit is a processing target of a second multi-valuing unit being one of the plurality of multi-valuing units is regarded as a second target pixel, the conversion unit converts the pixel array in the image data so that the first target pixel and the second target pixel are stored at serial addresses in the memory, and the error diffusion processing unit performs multi-valuing by the first multi-valuing unit for the first target pixel in the image data after conversion by the conversion unit and multi-valuing by the second multi-valuing unit for the second target pixel in the image data after conversion by the conversion unit in a parallel manner.

2. The image processing apparatus according to claim 1, wherein the conversion unit converts the pixel array in the image data through row/column transpose processing and deformation processing, in the row/column transpose processing, pixel rows aligned sequentially in the second direction in the image data are respectively converted into pixel columns being lines of pixels along the second direction, and the respective pixel columns are sequentially aligned in the first direction, and in the deformation processing, the image data after the row/column transpose processing is deformed in the second direction according to a diffusion range of the density error that is determined in advance.

3. The image processing apparatus according to claim 2, wherein when, in the image data before the row/column transpose processing, a pixel row to which the target pixel belongs is regarded as a first pixel row, a pixel row that is most distant from the first pixel row in the second direction within the diffusion range with the target pixel as a reference is regarded as an N-th pixel row, N is an integer of 2 or greater, and n is an integer from 1 to N−1, the conversion unit regards, as a shifted pixel number, a maximum value obtained by adding 1 to a sum of a pixel number in an n-th pixel row in the first direction within the diffusion range and a pixel number in an n+1-th pixel row in a direction opposite to the first direction within the diffusion range, and in the deformation processing, a pixel column in the image data after the row/column transpose processing is shifted in the second direction by the shifted pixel number with respect to a pixel column adjacent to the pixel column in the direction opposite to the first direction.

4. The image processing apparatus according to claim 2, wherein the conversion unit:

returns the pixel array in the image data to the original pixel array by performing deformation processing reverse to the deformation processing for the image data after multi-valuing by the error diffusion processing unit and performing row/column transpose processing reverse to the row/column transpose processing for the image data after the reverse deformation processing; and outputs, to a predetermined output destination, the image data with the pixel array returned to the original pixel array by the conversion unit.

5. The image processing apparatus according to claim 2, wherein the conversion unit shapes the image data before multi-valuing by the error diffusion processing unit by performing padding processing for filling a region with a pixel having a predetermined value, the region being generated due to shifting between the pixel columns in the second direction in the image data after the deformation processing.

6. The image processing apparatus according to claim 2, wherein the conversion unit divides the image data after the row/column transpose processing into a plurality of regions in the first direction, and performs the deformation processing for each of the plurality of regions, and the error diffusion processing unit performs multi-valuing for each of the plurality of regions.

7. The image processing apparatus according to claim 6, wherein when one of the plurality of regions is regarded as a target region, the error diffusion processing unit performs multi-valuing for a region including a partial region and the target region, the partial region being a part of a region adjacent to the target region in the direction opposite to the first direction and being continuous with the target region, and among data after multi-valuing performed for the region including the partial region and the target region, data relating to the target region is regarded as part of the image data after multi-valuing by the error diffusion processing unit.

8. An image processing method that, when image data including a plurality of pixels arrayed two-dimensionally in a first direction and a second direction intersecting with each other is input, and multi-valuing is performed for the image data that is input, with an error diffusion method of diffusing a density error generated at the time of multi-valuing for a pixel to peripheral pixels before multi-valuing, is for performing parallel multi-valuing with the error diffusion method for a plurality of target pixels while regarding, among the pixels before multi-valuing, a plurality of pixels with the density error diffused from another pixel that are determined as the target pixels, the image processing method comprising:

a storing step for storing, in a memory, the image data being input;

a converting step for converting a pixel array in the image data; and an error diffusion processing step for performing parallel multi-valuing with the error diffusion method for the plurality of target pixels, using a plurality of multi-valuing units, wherein in the converting step, when a pixel that belongs to one pixel row being a pixel line along the first direction in the image data before the converting step and is a processing target of a first multi-valuing unit being one of the plurality of multi-valuing units is regarded as a first target pixel, and a pixel that belongs to a pixel row adjacent in the second direction to the pixel row to which the first target pixel belongs in the image data before the converting step is a processing target of a second multi-valuing unit being one of the plurality of multi-valuing units is regarded as a second target pixel, the pixel array in the image data is converted so that the first target pixel and the second target pixel are stored at serial addresses in the memory, and in the error diffusion processing step, multi-valuing by the first multi-valuing unit for the first target pixel in the image data after the converting step and multi-valuing by the second multi-valuing unit for the second target pixel in the image data after the converting step are performed in a parallel manner.

* * * * *